United States Patent [19]
Li

[11] Patent Number: 5,880,423
[45] Date of Patent: Mar. 9, 1999

[54] WATER LEVEL SENSOR

[76] Inventor: Jui-Yang Li, No. 32, Lane 417, Ta Wan Road, Yung Kang Shih, Tainan Hsien, Taiwan

[21] Appl. No.: 907,501

[22] Filed: Aug. 8, 1997

[51] Int. Cl.⁶ ................................................. H01H 35/18
[52] U.S. Cl. ........................... 200/84 C; 73/313; 340/624
[58] Field of Search .................... 417/40, 44.1; 335/205; 307/118; 200/84 R, 84 C; 340/623, 624; 73/308, 313, 319, 322.5

[56] References Cited

U.S. PATENT DOCUMENTS 4,398,186  8/1983  Statz .
5,041,812  8/1991  Misaizu .
5,103,673  4/1992  Sawada .

*Primary Examiner*—Gerald Tolin
*Attorney, Agent, or Firm*—Rosenberg, Klein & Bilker

[57] ABSTRACT

A water level sensor includes a magnetic tube and a float disposed on a vertical oval rod portion of the magnetic tube. A magnetic switch is contained in the magnetic tube and connected with a power cord. The float has a center hole for the vertical oval bar to extend therein, an inner annular wall extending down to define the center hole with an outer annular wall, and an open lower end closed with a cap. And a magnetic ring is fixed around the center hole on an upper surface of the float. When the float moves down to a preset lower level in water of a tank, the magnetic ring and the magnetic switch produce induction to turn off the power to prevent the tank from burning owing to no water therein.

1 Claim, 3 Drawing Sheets

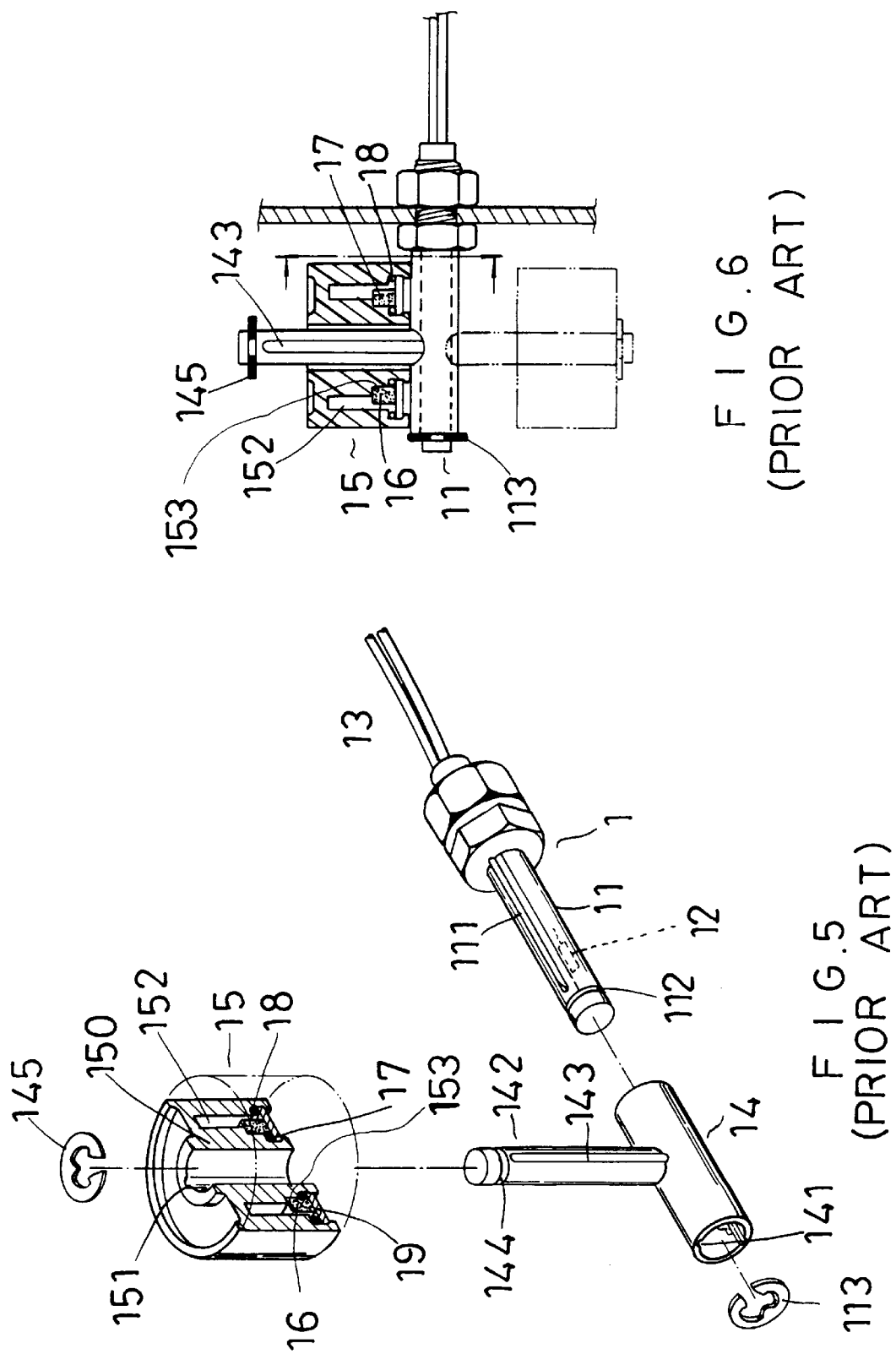

WATER LEVEL SENSOR

BACKGROUND OF THE INVENTION

This invention concerns a water level sensor, particularly keeping a water level at a preset height in a tank for preventing the tank from burning owing to no water therein.

Conventional drink water dispensers are provided with a tank disposed with a water level sensor to prevent the tank from burning. As the tank keeps water therein at a certain temperature or boils it, and if water in the tank becomes too little or is used up, the tank will be burned unless a water level sensor senses the water level and activates to turn off electric power.

A conventional water level sensor shown in FIG. 5 includes a magnetic tube 11, a sleeve 14 and a float 15 combined together. The magnetic tube 11 has straight projections 111 on an outer surface, an annular groove 112 for an elastic ring 113 to fit therein for keeping the sleeve around the magnetic tube 11. A magnetic switch 12 is disposed inside the magnetic tube 11 and connected with a power cord 13.

The sleeve 14 is a hollow tube, having straight grooves 141 in an inner surface, a vertical bar 142 formed to extend up from a center portion having straight projections 143 on an outer surface, an annular groove 144 near an upper end for an elastic ring 145 to fit therein for keeping the float 15 combined with the vertical bar 142.

The float 15 is shaped cylindrical, having a lower end open, an inner annular wall 150 defining a center hole for the vertical bar 142 to extend therein, two straight grooves 151 in the inner surface of the inner annular wall, an annular cavity 152 defined between the inner annular wall 150 and an outer annular wall, several annular engage members 153 on a lower end surface for fitting annular rings 16 therein, and then gaskets 17, 18 fitted around an inner surface and an outer surface and closed with a bent cap 19 on the lower open end of the float 15.

In using, referring to FIG. 6, as the water level sensor 1 is fixed with a side wall of a tank at the magnetic tube 11, and the sleeve 14 is combined with the magnetic tube 11 by means of the straight grooves 141 engaging the straight projections 111, and the elastic ring 113 fitted in the annular groove 112 to position the sleeve 14 in place. Then the vertical bar 142 is inserted in the float 15, letting the straight grooves 151 engaging the straight projections 143. Then the elastic ring 145 is fitted in the annular groove 144 to limit the position of the float 15, which moves up and down according to a water level. When the water level is too high or low, the float 15 moves also to activate the magnetic switch 13 to cut off the power coming from the power cord 13. Thus the tank can be prevented from burning with no water therein.

The conventional water level sensor has too many components and thus its cost is comparatively high. Besides, when the water level falls to a preset certain location, the magnetic ring 16 and the magnetic switch 12 produce induction to activate the power to be cut off. However, the magnetic switch 12 is separated from the magnetic ring 16 by the thickness of the magnetic tube 11 and the inner annular wall 150 so that magnetic force may sometimes not be transmitted well, causing induction impossible to be produced and failing to cut off the power even if the water level should fall down below the preset certain level.

SUMMARY OF THE INVENTION

One purpose of the invention is to offer a water level sensor possible to sense out a water level in a tank with certainty, for preventing the tank from burning with no water therein.

Another purpose of the invention is to offer a water level sensor having a simpler structure than the conventional one described above, for lowering its cost and enhancing work effect.

BRIEF DESCRIPTION OF DRAWINGS

This invention will be better understood by referring to the accompanying drawings, wherein:

FIG. 5 is a side view of a conventional water level sensor; and,

FIG. 6 is a cross-sectional view of the conventional water level sensor.

DETAILED DESCRIPTION OF THE PREFERRED EMBODIMENT

Figure 1:
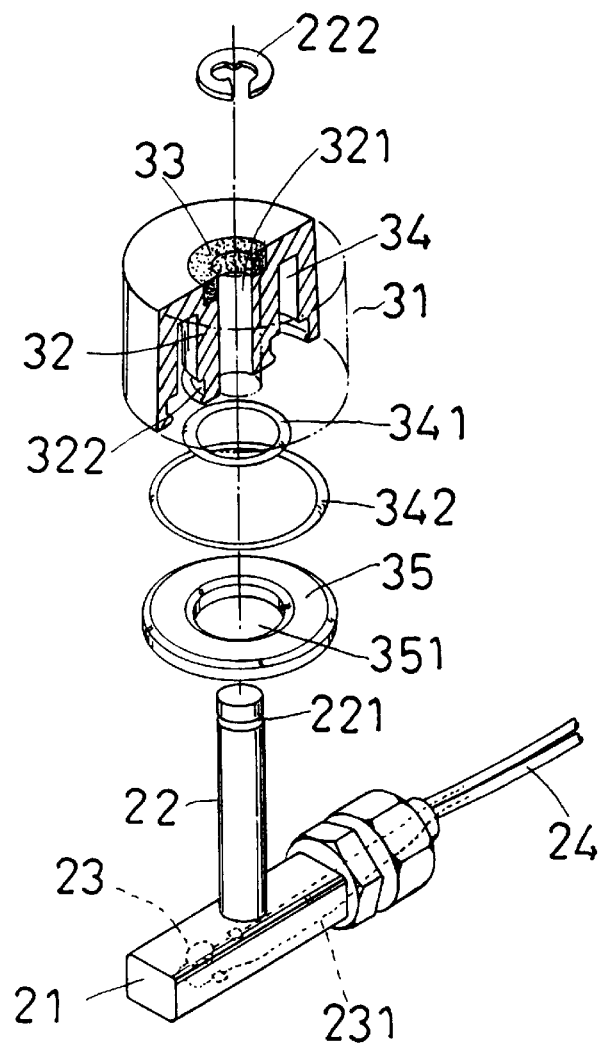
FIG. 1 is an exploded perspective view of a water level sensor in the present invention.

A preferred embodiment of a water level sensor in the present invention, as shown in FIG. 1, includes a magnetic tube 21 and a float 31 combined together.

The magnetic tube 21 is shaped as a polygonal post, a vertical oval cross-sectional rod portion 22 extending upright from a center portion and having an annular groove 221 near an upper end for a spring lock washer to engage therein. A magnetic switch 23 is fixed inside the magnetic tube 21, and a lead wire 231 connecting the switch 23 with a power cord 24.

The float 31 has one end open, an inner annular wall 32 extending down from an upper surface and defining a center oval cross-sectional hole 321, an annular cavity 322 in the inner wall 32, an annular oval magnetic ring 33 fitted in the cavity 322, an annular hollow 34 formed between the inner annular wall 32 and an outer annular wall, an inner gasket 341 and an outer gasket 342 fitted in the annular hollow 34, and annular cap 35 having a center hole 351 closed on the lower open end.

Figure 2:
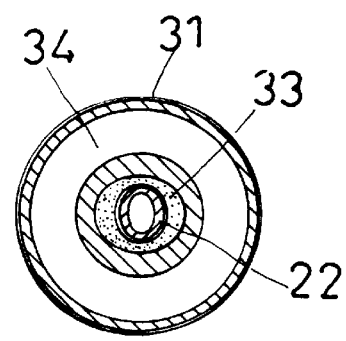
FIG. 2 is a cross-sectional view of the water level sensor in the present invention.
Figure 4:
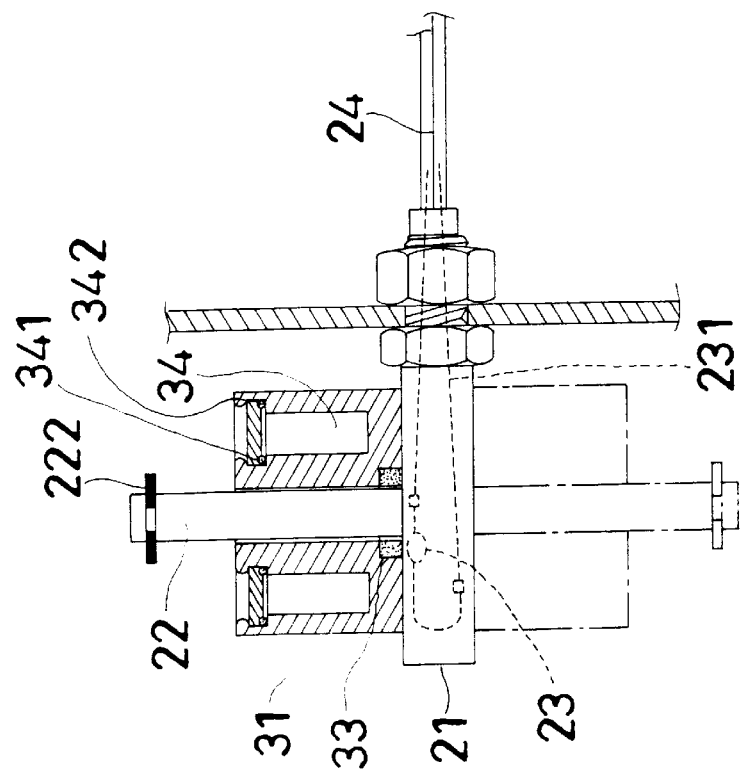
FIG. 4 is a side view of the water level sensor practically used in another way.
Figure 3:
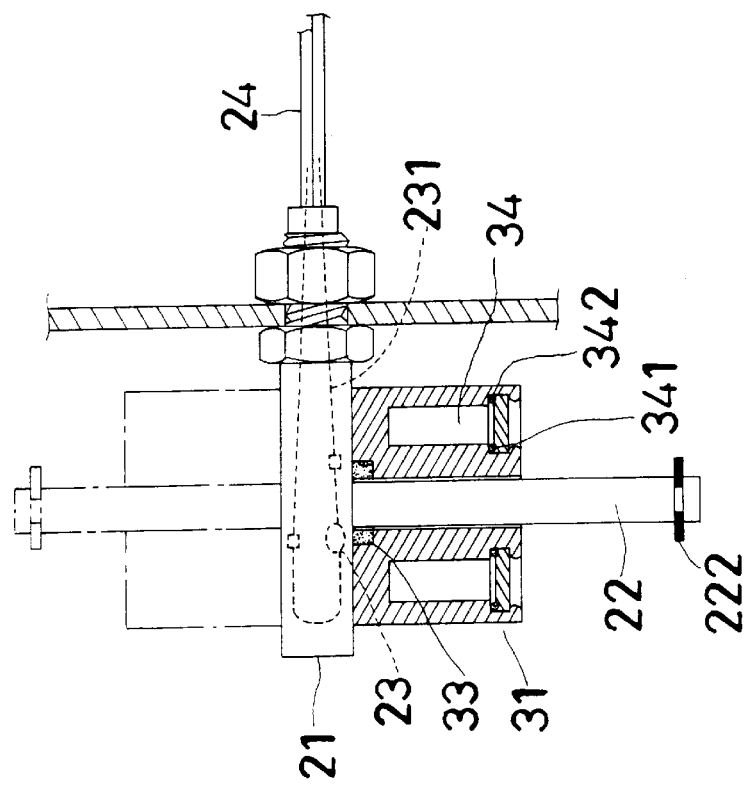
FIG. 3 is a side view of the water level sensor practically used in one way.

Referring to FIGS. 2, 3 and 4, in using the water level sensor, the sensor 31 is combined with the vertical rod portion 22 by the center oval hole 321 fitting in the rod portion 22. Then the spring lock washer 222 is fitted to engage the annular groove 221. After the water level sensor is put in water in a tank, the float may move up and down together with the water level moving up and down. When the float 31 moves to a preset level, the magnetic ring 33 and the magnetic switch 23 produce induction by mutual reaction and the induction signal is sent through the lead wire 31 to the power, which is then turned off. Thus the tank may not be burned with no water therein. In addition, the center hole 321 and the magnetic ring 33 are all of oval shaped cross-section, and the magnetic switch 23 is located in a 90 angle to the magnet ring 33 to receive evenly magnetic force, preventing bad transmitting as seen in the conventional water level sensor.

The water level sensor in the invention has advantages that the conventional one does not have, as follows.

1. It includes few components, saving time in assembling and enhancing work effect.
2. The magnetic ring produces good transmitting effect in addition to the simplified structure of the float actually improves the disadvantage of bad trans mitting in the conventional water level sensor.

3. The magnetic tube has a vertical oval rod portion formed as integral, with no need of a mold for production, saving expense for it, lowering effectively the cot.

While the preferred embodiment of the invention has been described above, it will be recognized and understood that various modifications may be made therein and the append appended claims are intended to cover all such modifications which may fall within the spirit and scope of the invention.

What is claimed is:

1. A water level sensor comprising a magnetic tube and a float disposed on said magnetic tube;

said magnetic tube shaped as a polygonal post, having an oval cross-sectional rod portion formed integral to extend up from a center portion, said oval cross-sectional rod portion formed with an annular groove near an upper end for a spring lock washer to engage therein, a magnetic switch disposed in an interior of said magnetic tube and connected with a lead wire with a power cord; and, said float having a lower end open, an annular inner wall extending down from an upper surface and defining a center through oval cross-section hole, an annular recess around said center through hole on said upper surface, an oval magnetic ring fitted in said annular recess, an annular hollow formed between said inner wall and an outer annular wall, said open lower end closed up with a cap with a center hole fitting with said center hole of said float, said float floating on water in a tank and moving up and down for sensing out correct water level, said magnetic ring and said magnetic switch producing induction by mutual reaction to turn off the power of heating and preventing the tank from burning caused by no water remained in said tank when said float moves down to a preset lowest level.

* * * * *